United States Patent
Yerton

(10) Patent No.: US 10,390,516 B2
(45) Date of Patent: Aug. 27, 2019

(54) PET TOY

(71) Applicant: R2P Group, Inc., Pleasanton, CA (US)

(72) Inventor: Nicholas R. Yerton, Danville, CA (US)

(73) Assignee: Cosmic Pet LLC, Wichita, KS (US)

( * ) Notice: Subject to any disclaimer, the term of this patent is extended or adjusted under 35 U.S.C. 154(b) by 162 days.

(21) Appl. No.: 15/599,113

(22) Filed: May 18, 2017

(65) Prior Publication Data
US 2017/0332603 A1 Nov. 23, 2017

Related U.S. Application Data

(60) Provisional application No. 62/338,430, filed on May 18, 2016.

(51) Int. Cl.
*A01K 15/02* (2006.01)

(52) U.S. Cl.
CPC ............ *A01K 15/025* (2013.01); *A01K 15/02* (2013.01)

(58) Field of Classification Search
CPC ...... A01K 15/025; A01K 15/026; A63H 5/00; A63H 3/28
USPC ................. 119/702, 707, 708, 709, 710, 711
See application file for complete search history.

(56) References Cited

U.S. PATENT DOCUMENTS

| | | | | |
|---|---|---|---|---|
| 3,416,488 A * | 12/1968 | Merl | ........................ | A63H 3/28 116/139 |
| 6,892,674 B1 * | 5/2005 | Dubinins | ............. | A01K 15/026 119/702 |
| 7,597,065 B2 * | 10/2009 | Jager | ..................... | A01K 15/025 119/709 |
| 9,004,010 B2 * | 4/2015 | Croix | ....................... | G10K 5/02 119/707 |
| 2009/0038560 A1 * | 2/2009 | Markham | ............ | A01K 15/026 119/709 |
| 2011/0048337 A1 * | 3/2011 | Specht | ................. | A01K 15/025 119/707 |
| 2011/0048338 A1 * | 3/2011 | Specht | ................. | A01K 15/026 119/709 |
| 2011/0214617 A1 * | 9/2011 | Markham | ............ | A01K 15/025 119/707 |
| 2012/0073514 A1 * | 3/2012 | Hansen | ................ | A01K 15/025 119/707 |
| 2013/0167780 A1 * | 7/2013 | Axelrod | ............... | A01K 15/025 119/710 |

\* cited by examiner

*Primary Examiner* — Trinh T Nguyen
(74) *Attorney, Agent, or Firm* — Rathe Lindenbaum LLP

(57) ABSTRACT

A pet toy may include a hollow compressible body having a mouth about an opening leading to an interior of the body and a tab having a head and a neck extending from the head. The neck extends through the opening while the head is larger than the opening. The neck is slidable through the opening to move the head between a silent position and a squeaking position. In the silent position, the head is spaced from the mouth to allow air flow from the interior of the body through the opening between the neck and the body without producing audible sound. In the squeaking position, the head is sufficiently close to the mouth such that airflow from the interior of the body through the opening between the neck and the body and between the mouth and the head produces an audible squeaking sound.

20 Claims, 4 Drawing Sheets

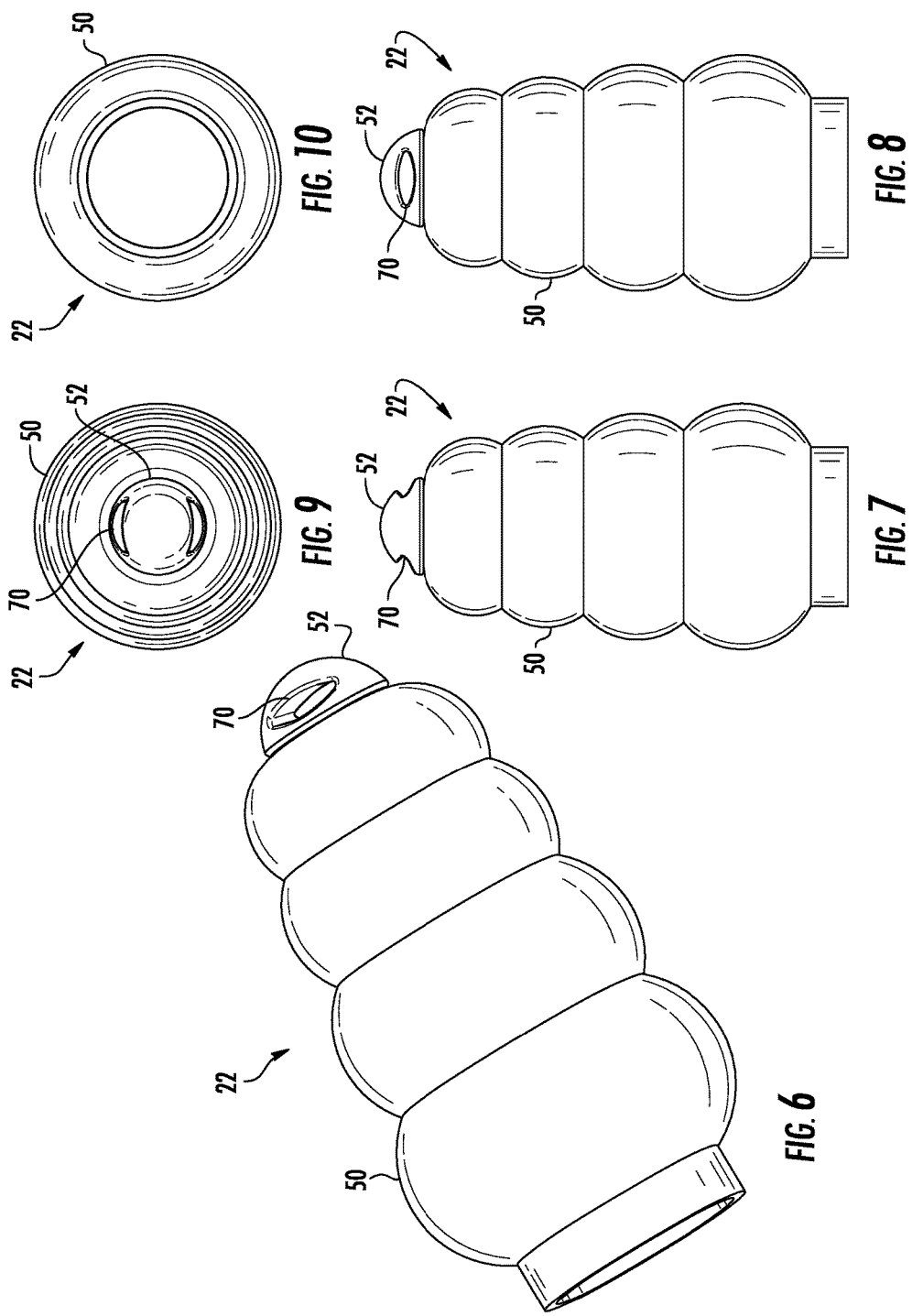

PET TOY

CROSS-REFERENCE TO RELATED PATENT APPLICATIONS

The present application claims priority under 35 USC 119 from U.S. Provisional Patent Application Ser. No. 62/338,430 filed on May 18, 2016 by Nicholas R. Yerton et al. and entitled PET BED AND PET TOYS, the full disclosure of which is hereby incorporated by reference.

BACKGROUND

Many pet toys include internal squeakers or noisemakers that produce sounds when squeezed or bitten. Although entertaining for the pet, such noise, at times, may become bothersome to the pet owner.

BRIEF DESCRIPTION OF THE DRAWINGS

FIG. 6 is an enlarged perspective view of the example squeaker portion.

FIG. 7 is a side view of the example squeaker portion.

FIG. 8 is a front view of the example squeaker portion.

FIG. 9 is a top view of the example squeaker portion.

FIG. 10 is a bottom view of the example squeaker portion.

DETAILED DESCRIPTION OF EXAMPLES

Figure 1:
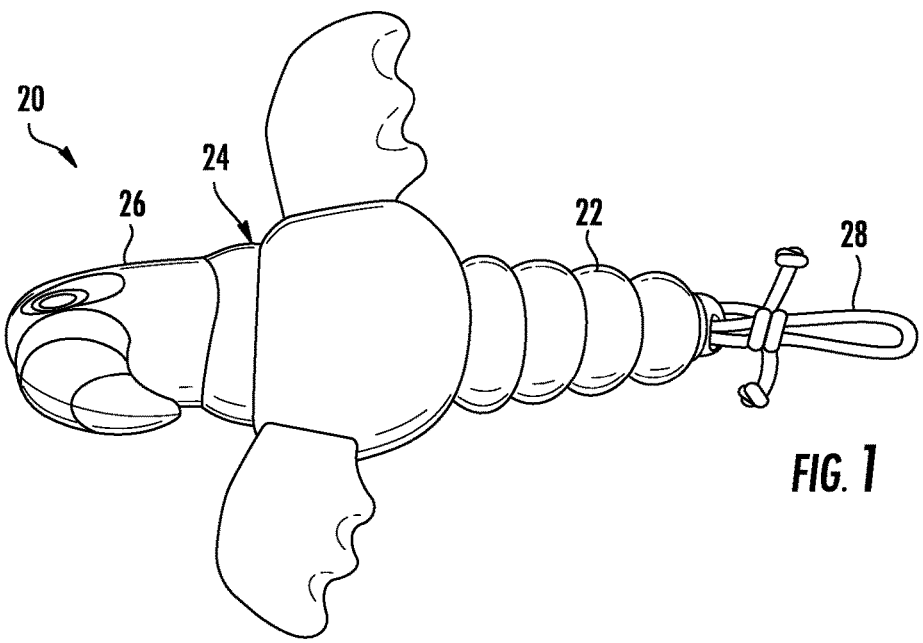
FIG. 1 is a perspective view of the first example squeaker pet toy having an example squeaker portion.

FIGS. 1-5 illustrate example squeaker pet toys. Each of the example squeaker pet toys comprises a squeaker portion which is actuatable between a noisemaking state in which noise is created upon compression of the squeaker portion and a silent state in which little or no noise results from the same amount of compression of the squeaker portion. In the examples shown in FIGS. 1-5, each of the squeaker pet toys comprises a figurine secured to the squeaker portion.

FIGS. 1-5 illustrate example squeaker pet toys 20. Squeaker pet toys 20 may be beneficial for pets that exhibit biting or chewing tendencies, such as dogs. Each of toys 20 is configured to produce audible sounds or squeaks in response to portions of the toy being compressed, squeezed or bitten.

Each of squeaker pet toys 20 comprises a squeaker portion 22 to which is secured a figurine 24. In the example illustrated, each figurine 24 comprises a first portion 26 secured to a first end of squeaker portion 22 and a second portion 28 secured to a second opposite end of squeaker portion 22. As a result, squeaker portion 22 forms a middle or intermediate portion of the overall object or creature emulated by toy 20. In other implementations, portion 28 of figurine 24 may be omitted.

In the example illustrated, FIG. 1 illustrates pet toys 20 in which the toy represents a bird, wherein figurine 24 is shaped like a bird (shown as a flamingo, parrot and toucan). In the example illustrated, portion 26 is shaped similar to a body, wings, head and beak of the bird while portion 28 is shaped similar to the feet of the bird. In other implementations, other birds may be provided.

Figure 2:
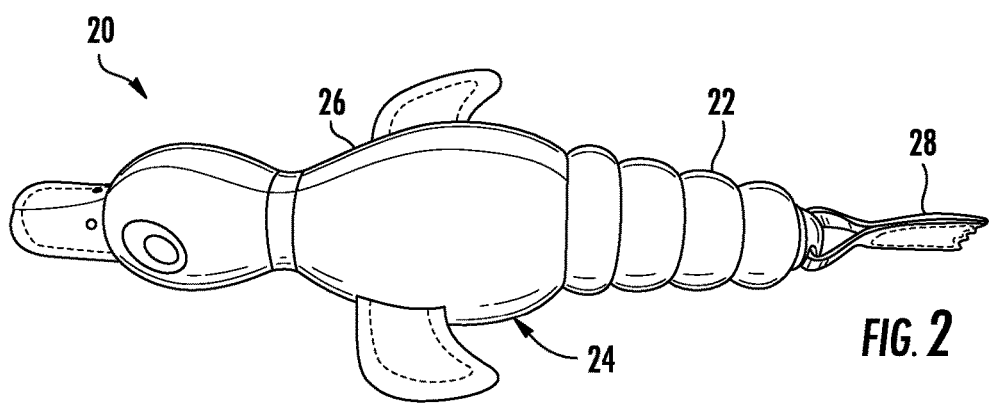
FIG. 2 is a perspective view of a second example squeaker pet toy having the example squeaker portion.
Figure 3:
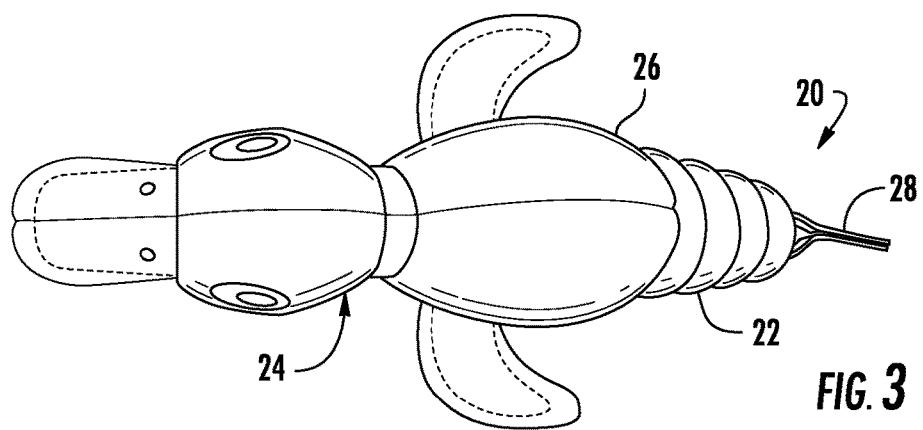
FIG. 3 is a perspective view of a third example squeaker pet toy having the example squeaker portion.

FIGS. 2 and 3 illustrate a pet toy 20 in which the toy has a shape corresponding to a duck. In the example illustrated, portion 26 is shaped similar to a body, wings, head and beak of the bird while portion 28 is shaped similar to the feet of the bird. In contrast to the birds shown in FIG. 1 in which the birds face in a direction transverse or perpendicular to the longitudinal centerline of the squeaker portion 22, the duck shown in FIGS. 2 and 3 faces in a forward direction, in line with the longitudinal direction and the longitudinal centerline of squeaker portion 22.

Figure 4:
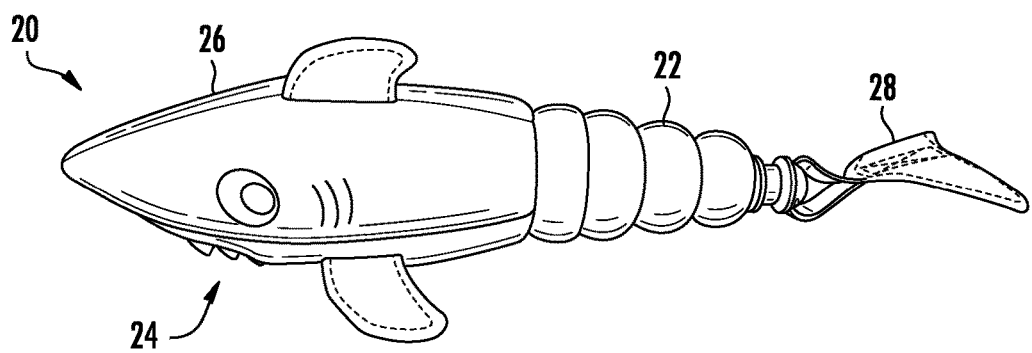
FIG. 4 is a perspective view of a fourth example squeaker pet toy having the example squeaker portion.
Figure 5:
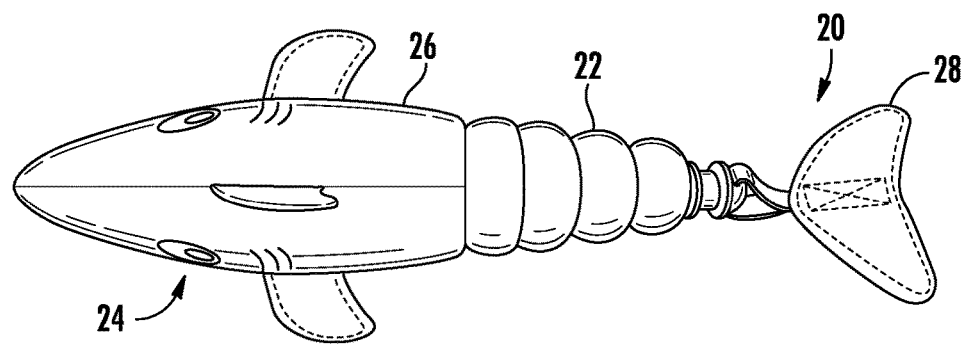
FIG. 5 is a top view of the fourth example squeaker pet toy of FIG. 4.

FIGS. 4 and 5 illustrate an example pet toy 20 having an overall shape of a shark. In the example illustrated, portion 26 of figurine 24 has a shape of a majority of the body, head and dorsal fins of the shark while portion 28 has a shape of the tail fin of the shark. In other implementations, figurine 24 may have other colors and shapes to represent other fish. In yet other implementations, figurine 24 may have other colors and shapes correspond to other animals or other objects.

In each of the pet toys 20 shown in FIGS. 1-5, portion 26 of figurine 24 comprises a filled fabric, an outer layer of fabric surrounding an interior which is filled with foam, polyester, cotton, beans, pellets, rice, particulates or other compressible filling material. In other implementations, portion 26 may be unfilled, having a hollow, empty interior. In the example illustrated, portion 28 of figurine 24 comprise the fabric panel or fabric panels secured to squeaker portion 22 such that squeaker portion 22 remains exposed and forms the outer surface of the overall pet toy 20. In the example illustrated, portion 28 of figurine 24 is secured to an actuator portion of squeaker portion 22 such that portion 28 further serves as a handle to move the actuator portion so as to actuate squeaker portion 22 between the noisemaking state and the silent state.

Figure 13:
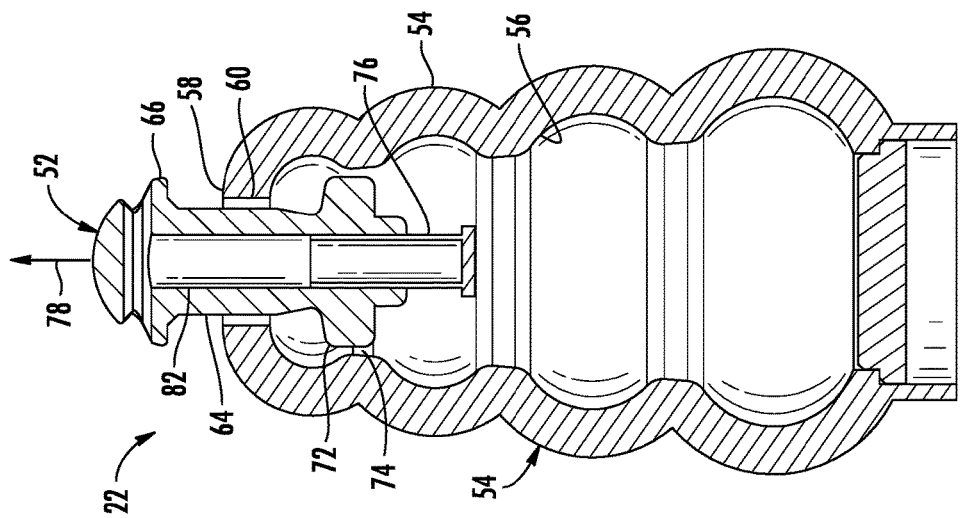
FIG. 13 is a sectional view of the squeaker portion of FIG. 11 in a silent state.
Figure 12:
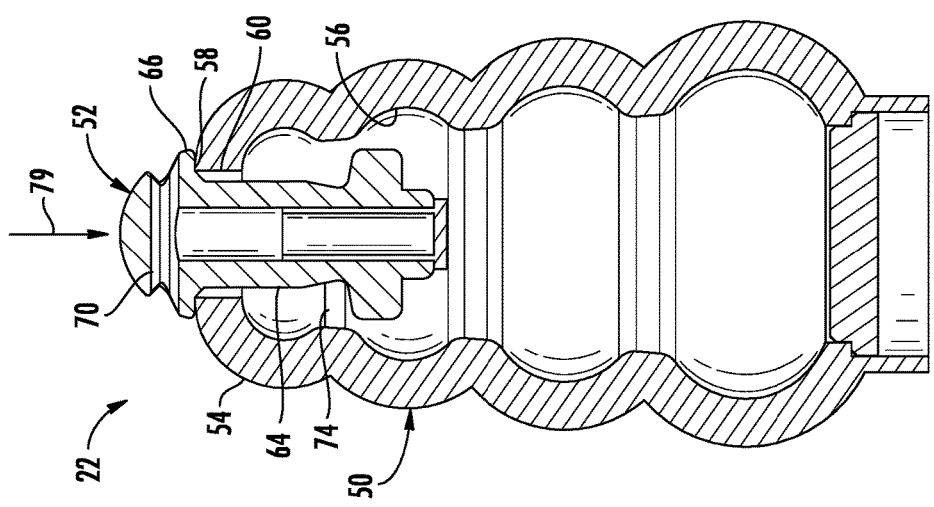
FIG. 12 is a sectional view of the squeaker portion of FIG. 11 in the noisemaking state.
Figure 11:
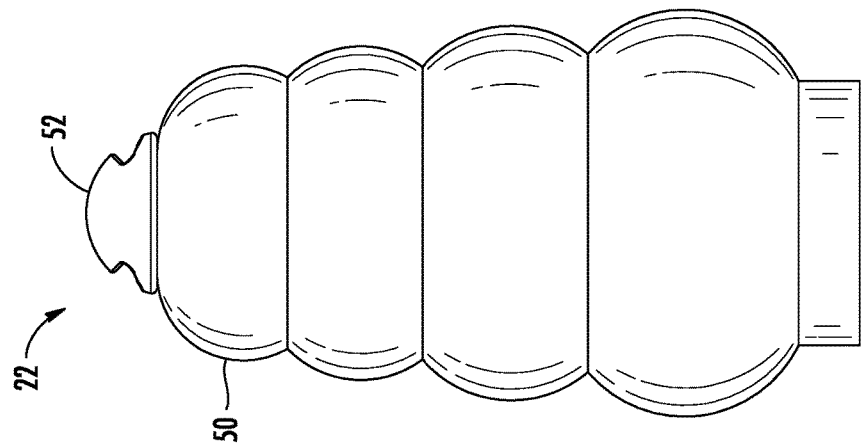
FIG. 11 is a side view of the example squeaker portion in a noisemaking state.

FIGS. 6-10 are external views of squeaker portion 22. FIG. 6 is a perspective or isometric view. FIGS. 7 and 8 are front and side views. FIG. 9 is a top view of squeaker portion 22. FIG. 10 is a bottom view of squeaker portion 22. FIGS. 11-13 illustrate the internals of squeaker portion 22 and its operation. FIG. 12 is a sectional view of squeaker portion 22 while squeaker portion 22 is in the noisemaking state. FIG. 13 is a sectional view of squeaker portion 22 while squeaker portion 22 is in the silent state.

As shown by FIGS. 12 and 13, squeaker portion 22 comprises body 50 and actuator tab 52. Body 50 comprises a hollow compressible structure having an outer wall 54 forming an interior 56 and a mouth 58 about an opening 60. In one implementation, wall 54 of body 50 is formed from a rubber or synthetic rubber material. In other implementations, wall 54 of body 54 is formed from a soft compressible and/or flexible polymer material. In the example illustrated, wall 50 has an outer shape similar to that of a beehive.

Opening 60 extends through wall 54 to facilitate communication with interior 56. Opening 60 receives actuator tab 52 and is sufficiently large such that air may flow through opening 60 without producing audible sound. Opening 60 guides movement of actuator tab 52 relative to mouth 58 which extends opposite to portions of actuator tab 52. In the example illustrated, mouth 58 is situated at an axial end of body 50. As a result, squeaker portion 22 has a greater length for enhanced sound production. In addition, actuator tab 52 is less likely to be chewed upon and is less likely to be received by a pet's mouth. In other implementations, opening 60 and mouth 58, along with actuator tab 52, may extend through a side or other portions of squeaker portion 22.

Actuator tab 52 comprises a movable plug extending through opening 60. Actuator tab 52 comprises a neck 64 and head 66. Neck 64 passes through opening 60 and interacts with the sides of opening 60 to guide sliding movement of actuator tab 52. As indicated above, the exterior sides of neck 64 are sufficiently spaced from the interior sides of opening 60 to allow the passage of air through opening 60 without producing audible sound. In one implementation, neck 64 is cylindrical. In another implementation, neck 64 has other cross-sectional shapes.

Head 66 extends from neck 64 and has a larger diameter or larger dimension as compared to neck 64 on the exterior of body 50. Head 66 extends over opening 60 and overlaps surfaces of mouth 58 which extend about opening 60. In the noisemaking state shown in FIG. 12 in which actuator tab 52 is in a squeaking position, lower surfaces of the head 66 face surfaces of mouth 58 and are sufficiently close to such surfaces of mouth 58 such that air passing between head 66 and mouth 58 produces an audible sound, such as a squeaking sound. In the silent state shown in FIG. 13 in which actuator 52 is in a silent position, those surfaces of head 66 that face mouth 58 are sufficiently spaced from mouth 58 to allow air flow from the interior 56 through opening 60 and further between head 66 and mouth 58 without producing audible sound. As a result, actuator tab 52 serves as an actuator to allow a person to selectively position actuator tab 52 in either the noisemaking position shown in FIG. 12 or the silent position shown in FIG. 13. Because squeaker portion 22 utilizes walls 54 of body 50 as part of the squeaker mechanism, the number of parts as well as the cost and complexity of squeaker portion 22 may be reduced.

As further shown by FIGS. 12 and 13, head 66 additionally comprises a passage 70 extending through head 66. Passage 70 facilitates securement of figurine portion 28 (shown in FIGS. 1-5) to actuator tab 52. As a result, figurine portion 28 additionally serves as a gripping surface or handle, allowing a person to more easily grasp actuator tab 52, when actuator tab 52 is further into body 50 in the noisemaking state, and to more easily pull actuator tab 52 to the silent position shown in FIG. 13. Once actuator tab has been pulled outward to the silent position shown in FIG. 13, person merely needs to push actuator tab 52 inwards further into interior 56 when the noise making state for squeaker portion 22 is desired.

In the example illustrated, squeaker portion 22 comprises additional features which assist in guiding movement of actuator tab 52 and retaining actuator tab 52 in a selected position to reduce the likelihood that squeaker portion 22 will be accidentally switched from a noisemaking state to a silent state or vice versa merely in response to a pet biting or pet interaction with body 50. In the example illustrated, squeaker portion 22 additionally comprises shoulder 72, retainer flap 74 (shown in FIG. 12) and guidepost 76. Each of such additional features is optional and may be omitted in particular implementations.

Shoulder 72 comprises an enlarged portion of actuator tab 52, larger than opening 60, so as to be captured within interior 56 of body 50. In the example illustrated, shoulder 72 comprises a rim projecting from an end portion of neck 64. In other implementations, shoulder 72 alternatively comprises a single tab or multiple spaced tabs projecting outwardly from a lower portion of neck 64. In yet other implementations, shoulder 72 may be provided by a bulbous structure or other structures provided at and connected to a lower portion of neck 64 within interior 54. In one implementation, shoulder 72 is sufficiently flexible such that actuator tab 52 may be intentionally passed through opening and into interior 56 when squeaker portion 22 is being assembled. Shoulder 72 inhibits actuator tab 52 from being accidentally completely withdrawn and separated from body 50 during biting and squeezing of body 50.

Retainer flap 74 comprises a resiliently flexible tab integrally formed with wall 54 and extending inwardly to a location between shoulder 72 and head 66 within interior 56. Flap 74 assists in retaining actuator tab 52 in the noisemaking position shown in FIG. 12. Flap 74 reduces the likelihood that a pet biting or chewing upon body 51 accidentally force actuator tab 52 through passage 60 to the silent position shown in FIG. 13. Flap 74 assists in maintaining head 66 sufficiently close to mouth 58 to produce such audible squeaking. Movement of actuator tab 52 from the noisemaking position shown in FIG. 12 to the silent position shown in FIG. 13 requires a sufficient amount of force in the axial direction as indicated by arrow 78 that is greater than forces normally encountered by tab 52 in directions 78 during simple biting, chewing or squeezing of squeaker portion 22.

When actuator tab 52 is withdrawn to the silent position shown in FIG. 13, flap 74 resiliently flexes and bends (as shown in FIG. 13) to allow the withdrawal of actuator tab 52. In such a position, flap 74 frictionally engages actuator tab 52 and shoulder 72 to resist accidental movement of actuator tab 52 back to the noisemaking position shown in FIG. 12. Movement of actuator tab 52 from the silent position shown in FIG. 13 to the noisemaking position shown in FIG. 12 requires a sufficient amount of force in the axial direction as indicated by arrow 79 that is greater than forces normally encountered by tab 52 in directions 79 during simple biting, chewing or squeezing of squeaker portion B22.

Guidepost 76 comprises a post extending from and supported by wall 54 within interior 56. Guidepost 76 extends along the longitudinal centerline of squeaker portion 22 and extends into an interior 82 of actuator tab 52. Guidepost 76 slidably contacts the interior sides of passage 82 to guide movement of actuator tab 52 in directions 78 or direction 79. Guidepost 76 facilitates more reliable positioning of actuator tab 52 within opening 66 to inhibit inadvertent noise that may result when actuator tab 52 becomes misaligned within opening 60. Guidepost 76 has a sufficient length to be received within passage 82 when tab 52 is in the silent position shown in FIG. 13.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A pet toy comprising:
   a hollow compressible body having a mouth about an opening leading to an interior of the body;
   a tab having a head and a neck extending from the head, wherein the neck extends through the opening, wherein the head is larger than the opening and wherein the neck is slidable through the opening to move the head between a silent position in which the head is spaced from the mouth to allow air flow from the interior of the body through the opening between the neck and the body without producing audible sound and a squeaking position in which the head is sufficiently close to the mouth such that airflow from the interior of the body through the opening between the neck and the body and between the mouth and the head produces an audible squeaking sound.

2. The pet toy of claim 1 further comprising a guidepost supported within the interior of the body, wherein the tab is slidable along the guidepost.

3. The pet toy of claim 1, wherein the tab projects from a first end of the body, pet toy further comprising a figurine secured to a second end of the body opposite the first end.

4. The pet toy of claim 3, wherein the figurine comprises a first portion secured to the second end of the body and a second portion secured to the tab to move with the tab.

5. The pet toy of claim 3, wherein the body comprises a flexible polymer and wherein the figurine comprises a filled fabric.

6. The pet toy of claim 1 further comprising a first figurine portion secured to a first end of the body and a second figurine portion secured to the tab, wherein the body between the first figurine portion and the second figurine portion forms an exterior of the pet toy.

7. The pet toy of claim 1, wherein the body has an exterior profile that tapers towards the tab.

8. The pet toy of claim 1, wherein the body symmetrically extends about the tab.

9. The pet toy of claim 1 further comprising a retainer to releasably retain the head in the squeaking position.

10. The pet toy of claim 9, wherein the tab comprises a shoulder and wherein the retainer comprises a resiliently flexible flap projecting into engagement with the shoulder.

11. The pet toy of claim 10, wherein the shoulder is a resiliently flexible between a flexed state such that the shoulder may be passed through the opening and a relaxed state in which the shoulder is wider than the opening.

12. The pet toy of claim 9, wherein the retainer extends within the interior.

13. The pet toy of claim 1, wherein the head is retained outside of the body in the silent position and in the squeaking position.

14. The pet toy of claim 1, wherein the head is larger than the opening and the mouth, the head being exterior to the body.

15. The pet toy of claim 1, wherein exterior size of the neck are sufficiently spaced from interior size of the opening to allow passage of air through the opening without producing audible sound.

16. The pet toy of claim 1, wherein the head interacts with the body in the squeaking position such that air passing between the body and the head produce the audible squeaking sound.

17. The pet toy of claim 1 further comprising a passage extending through the head, from a first side of the head to a second opposite side of the head, external to the body.

18. The pet toy of claim 1 further comprising a figurine directly secured to the head external to the body, the figurine be movable with the head.

19. The pet toy of claim 1, wherein the body comprises beehive shaped body having a series of individual interconnected hollow lobes extending along and encircling an axis along which the tab moves between the silent position and the squeaking position.

20. The pet toy of claim 2, wherein the tab comprises an internal bore receives the guidepost, the internal bore having an internal surface that contacts an external surface of the guidepost when the head is in the silent position and when the head is in the squeaking position.

* * * * *